United States Patent
Luna et al.

(10) Patent No.: US 9,965,143 B2
(45) Date of Patent: May 8, 2018

(54) 3D MOBILE USER INTERFACE WITH CONFIGURABLE WORKSPACE MANAGEMENT

(71) Applicant: Seven Networks, LLC, Marshall, TX (US)

(72) Inventors: Michael Luna, San Carlos, CA (US); Trevor A. Fiatal, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 400 days.

(21) Appl. No.: 14/690,690

(22) Filed: Apr. 20, 2015

(65) Prior Publication Data

US 2015/0227283 A1    Aug. 13, 2015

Related U.S. Application Data

(63) Continuation of application No. 13/075,887, filed on Mar. 30, 2011, now Pat. No. 9,043,731.

(60) Provisional application No. 61/319,195, filed on Mar. 30, 2010.

(51) Int. Cl.
| | |
|---|---|
| *G06F 3/0482* | (2013.01) |
| *G06F 3/0481* | (2013.01) |
| *H04M 1/725* | (2006.01) |
| *G06F 3/0484* | (2013.01) |

(52) U.S. Cl.
CPC ........ *G06F 3/04815* (2013.01); *G06F 3/0482* (2013.01); *G06F 3/04842* (2013.01); *H04M 1/72583* (2013.01)

(58) Field of Classification Search
CPC combination set(s) only.
See application file for complete search history.

(56) References Cited

U.S. PATENT DOCUMENTS

| | | | |
|---|---|---|---|
| 5,793,365 | A | 8/1998 | Tang et al. |
| 5,910,799 | A | 6/1999 | Carpenter et al. |
| 6,288,718 | B1 | 9/2001 | Laursen et al. |
| 7,055,091 | B1 | 5/2006 | Williams |
| 7,096,030 | B2 | 8/2006 | Huomo |
| 7,117,445 | B2 | 10/2006 | Berger |
| 7,283,846 | B2 | 10/2007 | Spriestersbach et al. |
| 7,313,760 | B2 | 12/2007 | Grossman et al. |

(Continued)

OTHER PUBLICATIONS

Final Office Action dated Jan. 7, 2015 for U.S. Appl. No. 13/075,887.

(Continued)

*Primary Examiner* — Namitha Pillai
(74) *Attorney, Agent, or Firm* — NK Patent Law, PLLC

(57) ABSTRACT

A mobile terminal is provided. The terminal includes a display unit configured to display a three-dimensional image comprising at least a plurality of objects, a memory unit configured to store property information for a plurality of applications, wherein each of the plurality of applications corresponds to a one object of the plurality of objects, and a controller. The controller is configured to detect a selection of the plurality of objects, execute the plurality of applications corresponding to the selected plurality of objects, generate priority information to determine priority levels for the executed plurality of applications based on the property information, and control the display unit to arrange a display of the executed plurality of applications on the three-dimensional image based on position information mapped to the generated priority information.

18 Claims, 12 Drawing Sheets

(56) References Cited

U.S. PATENT DOCUMENTS

| | | |
|---|---|---|
| 7,526,458 B2 | 4/2009 | Flinn et al. |
| 7,886,000 B1 | 2/2011 | Polis et al. |
| 7,941,752 B2 | 5/2011 | Ozugur et al. |
| 8,265,658 B2 | 9/2012 | Issa et al. |
| 8,396,759 B2 | 3/2013 | Mehta et al. |
| 8,559,931 B2 | 10/2013 | Moon et al. |
| 8,681,105 B2 | 3/2014 | Huh et al. |
| 8,725,177 B2 | 5/2014 | Rajaniemi |
| 8,737,961 B2 | 5/2014 | Ma et al. |
| 8,744,478 B2 | 6/2014 | Jagetiya |
| 2003/0069940 A1 | 4/2003 | Kavacheri et al. |
| 2003/0236893 A1 | 12/2003 | Nakamura |
| 2005/0034084 A1 | 2/2005 | Ohtsuki et al. |
| 2005/0091272 A1 | 4/2005 | Smith et al. |
| 2006/0250378 A1 | 11/2006 | Fabre et al. |
| 2007/0035513 A1 | 2/2007 | Sherrard et al. |
| 2008/0057998 A1 | 3/2008 | Christensen et al. |
| 2008/0261660 A1 | 10/2008 | Huh et al. |
| 2008/0263024 A1 | 10/2008 | Landschaft et al. |
| 2008/0309617 A1 | 12/2008 | Kong et al. |
| 2009/0070030 A1 | 3/2009 | Isoda et al. |
| 2010/0302056 A1 | 12/2010 | Dutton et al. |
| 2010/0331016 A1 | 12/2010 | Dutton et al. |
| 2011/0099486 A1 | 4/2011 | Nesladek et al. |
| 2011/0191611 A1 | 8/2011 | boni ang gaw go et al. |
| 2012/0110052 A1 | 5/2012 | Smarr et al. |
| 2012/0190386 A1 | 7/2012 | Anderson |
| 2014/0171116 A1 | 6/2014 | LaMarca et al. |
| 2014/0194146 A1 | 7/2014 | Yarvis |
| 2014/0365944 A1 | 12/2014 | Moore et al. |

OTHER PUBLICATIONS

Non-Final Office Action dated Jun. 19, 2014 for U.S. Appl. No. 13/075,887.
Luca Lamorte, et al.: "Smart Space a new dimension of context", AISB Convention Apr. 9, 2009.
Tasker for Android, Pre-Release Version History Aug. 31, 2009 to Jul. 1, 2010, available on https://tasker.dinglisch.net/changes/prereleasechanges.html.
Tasker for Android, Tasker History Nov. 2009 and Jun. 2010, available on https://tasker.dinglisch.net/history.htm.
Tasker for Android, Tasker—Total Automation for Android, Dec. 20, 2016, available on https://tasker.dinglisch.net/index.html.
Brad Linder: "GeoPix changes your Android wallpaper based on your location", mobiputing, Apr. 15, 2010.
USPTO, Non-Final Rejection for U.S. Appl. No. 14/467,750, dated Jan. 21, 2016.
USPTO, Non-Final Rejection in U.S. Appl. No. 14/726,594 dated Aug. 9, 2017.

＃ 3D MOBILE USER INTERFACE WITH CONFIGURABLE WORKSPACE MANAGEMENT

CROSS-REFERENCE TO RELATED APPLICATION(S)

This application claims priority to U.S. Utility application Ser. No. 13/075,887 entitled "3D MOBILE USER INTERFACE WITH CONFIGURABLE WORKSPACE MANAGEMENT," which was filed on Mar. 30, 2011, U.S. Provisional Patent Application No. 61/319,195 entitled "ZOOM 3D USER INTERFACE," which was filed on Mar. 30, 2010, the contents of both of which are expressly incorporated by reference herein.

TECHNICAL FIELD

The present disclosure relates generally to a user environment and more particularly to a three-dimensional (3D) user environment of a mobile device.

BACKGROUND

With increased reliance on mobile devices in meeting the demands of daily lives and even more so for entertainment purposes, the already prevalent field of mobile applications and services continues to grow at an accelerated pace. There is no shortage of mobile 'gadgets' that a user can download to or access from his/her mobile device. An average user or consumer uses a portable device for a vast variety of functions, from checking email, texting, conducting/initiating conference calls, to finding restaurants, tracking flight status, and the like.

However, form factor of mobile devices or other portable devices remains a dominant factor in design goals to remain competitive in the marketplace. While screen size and resolution have increased in newer generation devices, there remains a struggle for a user to fit and organize all of his/her mobile 'tools' in an intuitive and easy to navigate manner on a mobile device. Users face similar challenges for non-portable electronic devices as well.

DETAILED DESCRIPTION

Figure 1:
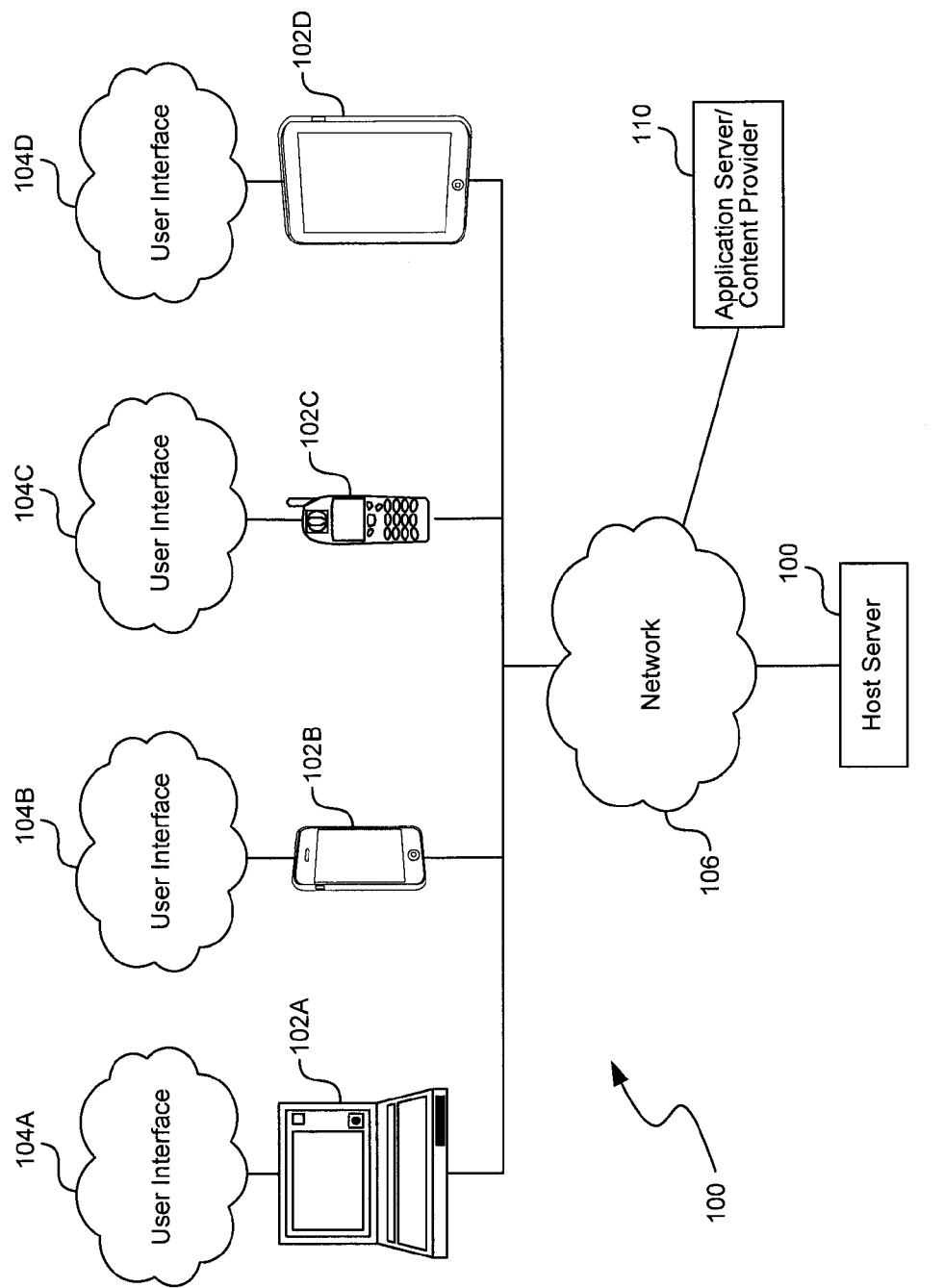
FIG. 1 illustrates examples of devices with user environments having 3D-enabled user interfaces (e.g., or mobile user interfaces for mobile devices) with configurable workspace functionalities.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor, are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure include systems and methods of 3D user interfaces (for mobile and non-mobile devices) with configurable workspace management capabilities and related functionalities.

FIG. 1 illustrates examples of devices 102A-D with user environments having 3D-enabled user interfaces (e.g., or mobile user interfaces for mobile devices) with configurable workspace functionalities.

The client devices 102A-D can be any system and/or device, and/or any combination of devices/systems that is able to establish a connection with another device, a server and/or other systems such as host server 100 and/or application server/content provider 110. Client devices 102A-D each typically include a display and/or other output functionalities to present information and data exchanged between among the devices 102A-D and/or the host server 100 and/or application server/content provider 110.

For example, the client devices 102A-D can include mobile or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g., an iPad), a handheld console, a handheld gaming device or console, an iPhone, and/or any other portable, mobile, handheld devices, etc. In one embodiment, the client devices 102A-D and host server 100/app server 110 are coupled to a network 106. In some embodiments, the devices 102A-D and host server 100 may be directly connected to one another.

The input mechanism on client devices 102A-D having 3D-enabled user interfaces can include touch screen keypad (including single touch, multi-touch, gesture sensing, etc.), a physical keypad, or a combination of the above. The 3D user interfaces and the configurable workspaces disclosed herein can be actuated and interacted with using any conventional or known input device including but not limited to physical keyboard, touch screen display, motion sensor, microphone, mouse, other types of pointer devices and any additional input device. The 3D user interface functionality can be provided locally by the client devices 102A-D and used to access applications (e.g., including mobile applications), accounts, websites, services, documents, files, media, or any other content such as those provided by a third party host (e.g., application server/content provider 110).

3D user interface (UI) functionality and the configurable workspace features of the user environment can be provided locally by the devices 102 through the mobile device manufacturer, provided through the device operating system, by a network service provider, through a downloaded widget from a third party site, network service provider, or from the host server 100. The 3D UI and/or workspace configuration functionalities may also be provided and enabled on a per application/content basis based on the services provided by the application server/content provider 110 via a user environment manager. Functions and techniques performed by the user environment manager on devices 102A-D for 3D UI rendering and workspace configuration/management and the related components therein are described in detail with further reference to the example of FIG. 6.

In one embodiment, 3D UI and/or workspace configuration functionalities are in part or in whole provided remotely to the devices 102A-D, for example by the host server 100. For example, the host server 100 can include one or more user environment managers (e.g., such as that illustrated in the example of FIG. 6) accessible over the network 106 by devices 102 to enable 3D user interface features, such as those that will be described with further references to description associated with example FIG. 2-5. The 3D rendering functionalities, when provided remotely, may be accessed by the devices 102 in the cloud. In addition, the 3D UI and workspace configured as a as result thereof, may be streamed to the devices 102 on demand, for example, based either on local processes occurring on the device 102 itself or based on processes driven by applications or services provided by the app server/content provider 110.

Functions and techniques performed by the user environment manager for 3D UI rendering and/or workspace management/configuration, which can reside on the client devices 102 in part or in whole and/or or host server 100 in part or in whole and the components therein are described in detail with further references to the examples of FIG. 2.

The network 106, over which the client devices 102A-D, the host server 100, and/or app server 110 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, and other services through any known or convenient protocol, such as, but is not limited to, the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-D and the host server 100 and may appear as one or more networks to the serviced systems and devices. In one embodiment, communications to and from the client devices 102A-D can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 2A:
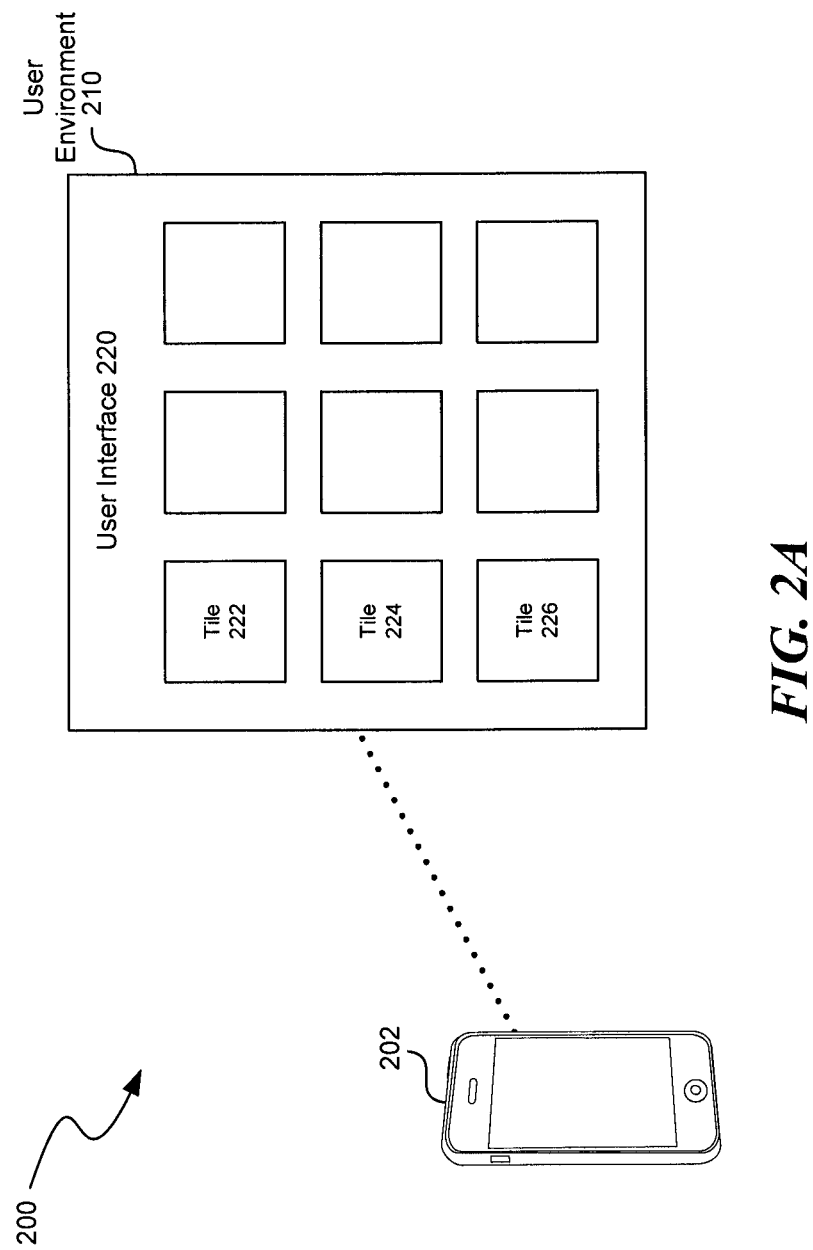
FIG. 2A depicts an example diagram showing a user interface with multiple indicators in the form of tiles which can be used to access various workspaces in the user environment.

FIG. 2A depicts an example diagram 200 showing a user interface 220 with multiple indicators 222, 224, and 226 in the form of tiles which can be used to access various workspaces in the user environment 210.

The user environment 210 accessible on the device 202 (e.g., a mobile device) as shown includes a user interface 220 having indicators 222, 224, and 226, each of which being associated with a workspace. The indicators can be selected (e.g., by touch screen, keypad, or pointer selection) to view, access, or otherwise interact with an associated workspace. In one embodiment, each of the first grouping of indicators are also viewable in the third dimension in the workspace (e.g., such as scrolling through a stack of icons/tiles representing applications in the z-direction (depth)). As further illustrated in the example of FIG. 3, such workspaces can graphically be presented as having a 3D relationship to the user interface 220. Multiple workspaces can also be depicted in the user environment as having a 3D relationship with one another (e.g., as different layers shown by having different 'depths').

Figure 2B:
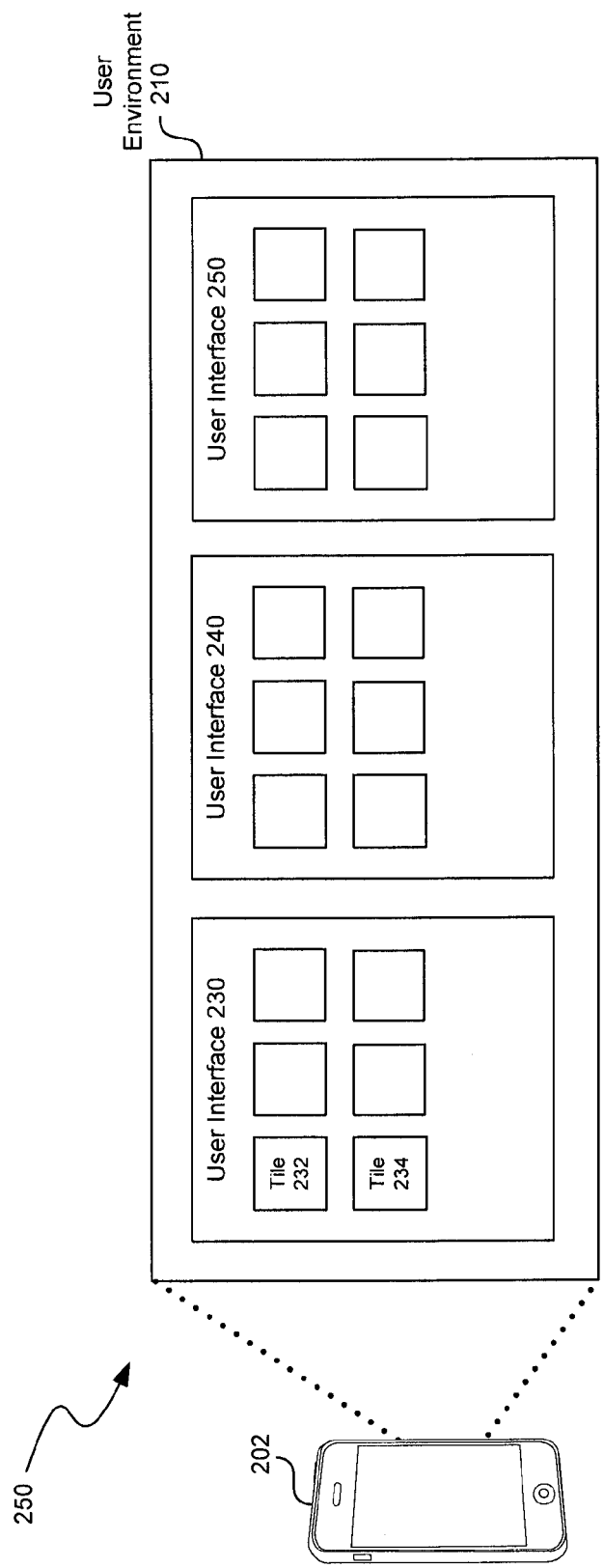
FIG. 2B depicts another example diagram showing user interfaces with multiple indicators in the form of tiles which can be used to access various workspaces in the user environment.
Figure 2C:
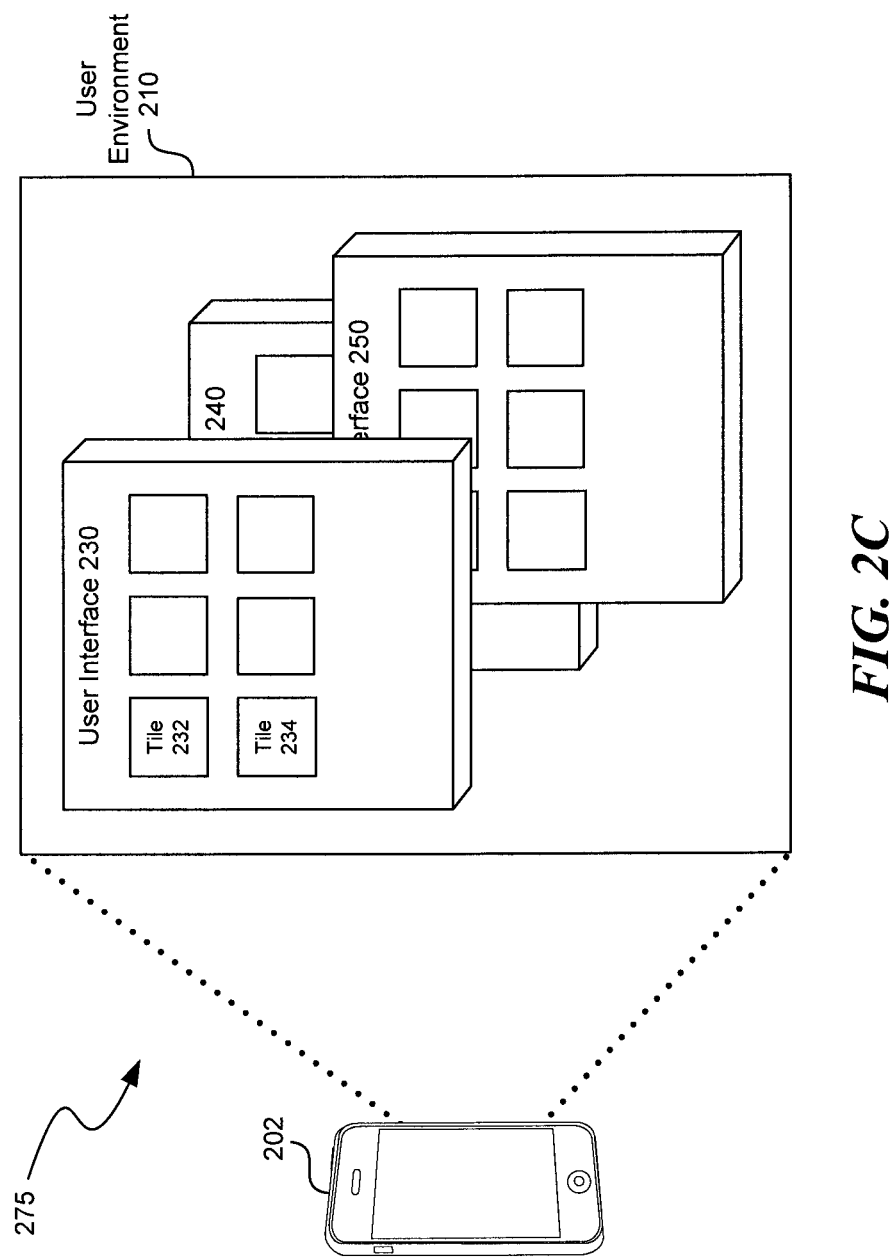
FIG. 2C depicts another example diagram showing multiple user interfaces with multiple indicators in the form of tiles which can be used to access various workspaces in the user environment.

In general, the user environment (UE) 210 can have multiple user interfaces, depicted as having a planar relationship (e.g., in the same plane or in a single layer) with one another. As shown in the example of FIG. 2B, the user environment 210 has multiple user interfaces 230, 240, 250 each having a planar relationship with one another, or shown in the same 'layer' in the user environment. Each UE can include indicators (e.g., the 232, 234, etc.) used for accessible workspaces which can be rendered in 3D (e.g., as having depth parameters). FIG. 2C depicts an example diagram showing multiple user interfaces 230, 240, 250 as having a 3D relationship with one another (shown in different depths) in the user environment 210.

Figure 3:
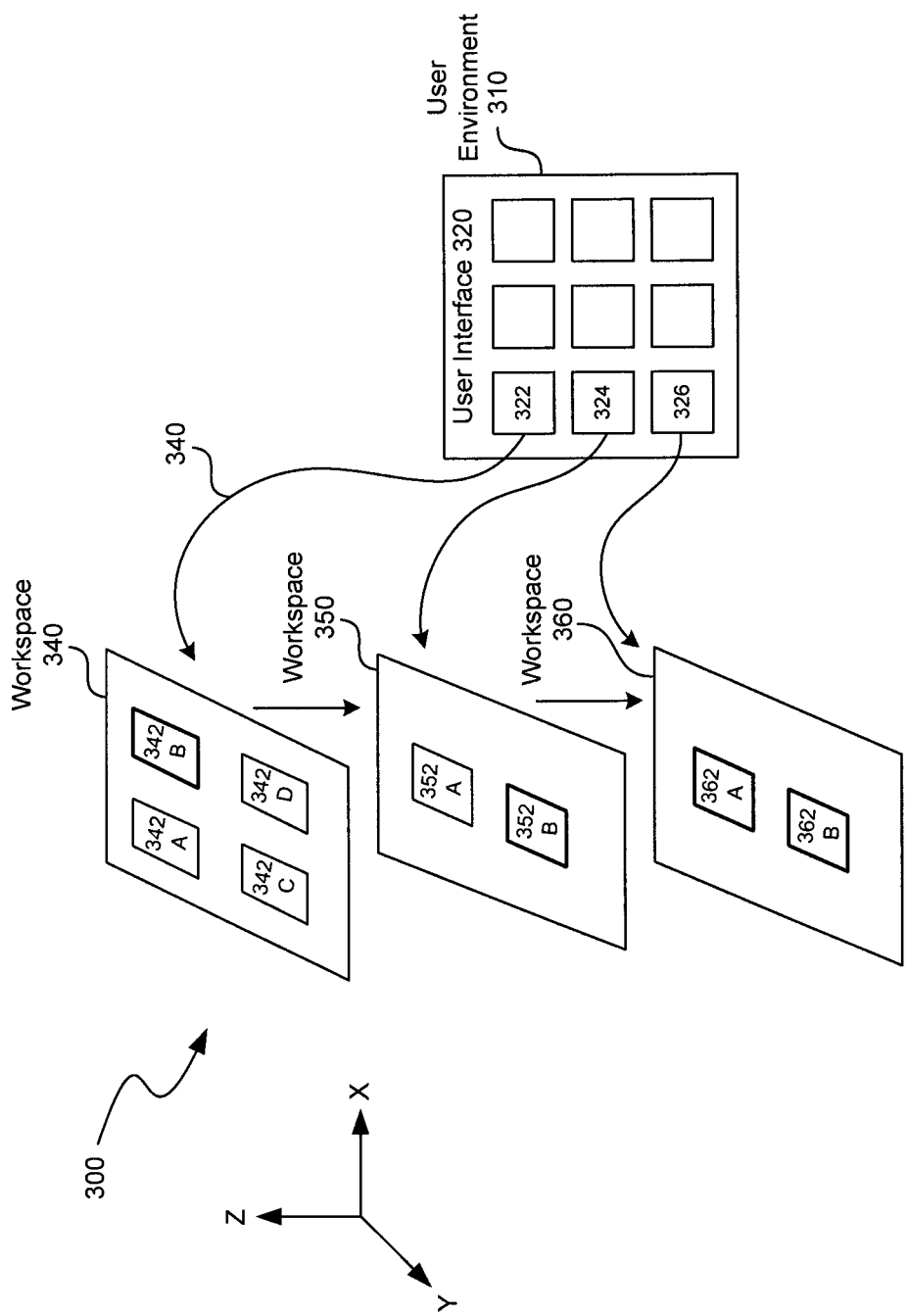
FIG. 3 depicts an example diagram showing multiple workspaces presentable in 3D in the user environment.

FIG. 3 depicts an example diagram 300 showing multiple workspaces 340, 350, and 360 presentable in 3D in the user environment 310.

Each of the workspaces can be accessed by selecting the associated indicators 322, 324, or 326 in the user interface 320. The user interface 320 can be the home screen or any other screen. When indicator 322 (e.g., tile, button, key, icon, drop down box, a list, or any other type of user interface component, etc. able to be detected/sensed by a user) is selected by a user and detected by the system, the associated workspace 340 can be presented in the user environment 310, as having a third dimension (depth in the z-direction with the user interface 320 in the z-y plane). Indicators can be visually or audibly detectable.

In one embodiment, the workspace 340 can be associated with one or more services (e.g., mail, chat, applications, mobile apps, etc.). Such associated services can have indicators in the workspace 340, which are selectable by a user to access a corresponding service. In some instances, the grouping of services associated with the workspace 340, or any other workspaces 350, 360, and the like, can be set in default (by device manufacturer, by device operating system, by a particular service/application, or by a network service provider, or any other third party), user-specified, user configured, re-configured, or re-adjusted. Specific services may be added by a user to the grouping in a particular workspace 340, 350, or 360. Each workspace may be created by a user with all or a partially customized selection of services associated with groupings of indicators.

Figure 4:
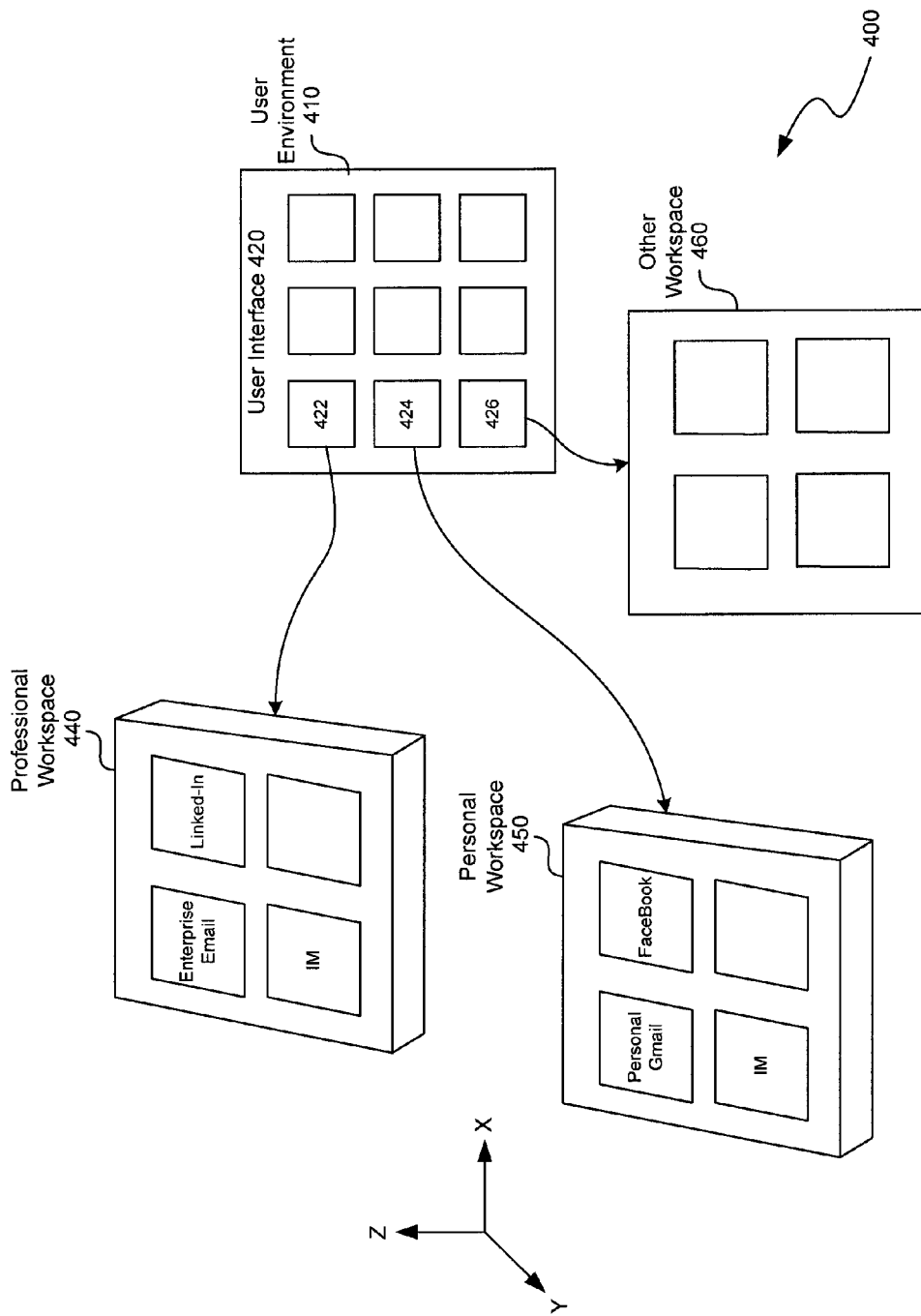
FIG. 4 depicts another diagram showing example workspaces configured for professional and personal functions, presentable in 3D in the user environment.

In one embodiment, as shown in the example of FIG. 4, a first workspace is associated with a first associated function (e.g., personal workspace) and a second workspace can be associated with a second associated function (e.g., professional workspace). Such functions can be linked by default or specified by the user. Each workspace can thus be linked to services, functions and/or applications related the specified function.

For example, the professional workspace 440 can be linked to a user's work email, Linked-in account, mobile application, or work-based IM chat services, and such services can be accessed by the user using the grouping of indicators accessible in the user environment through workspace 440. Similarly, the user's personal workspace 450 can be linked to their personal mail accounts (e.g., Gmail, MSN mail, Yahoo! Mail, etc.), their personal social networking accounts (e.g., Facebook, Twitter feeds, etc.), and/or personal chat IM accounts, etc. Individual services may be set in factory default and subsequently modified by the user. For example, the user can add or remove individual accounts or services for a particular workspace such that a combination of default services and user-selected services are associated with a particular workspace.

In addition, entire workspaces can be created from scratch by the user. In some instances, based on the function for the workspace specified by the user, the system can suggest a set of services and their associated indicators to be graphically shown when the workspace is shown and the user can modify as desired.

Additional types of functions associated with a workspace may be specified or defined by the user or any other third party including but not limited to, service providers, applications, or by the device platform (hardware and/or software). For example, workspace 460 may be associated with a user's hobby, such as sports, and can include identifiers dedicated to the user's aggregation of services/applications used in association with sports (e.g., scores tracking applications, ESPN mobile, workout trackers, NBA.com, CBSSports, etc.). Workspace 460 may be associated with a gaming environment that is 3D enabled. Additional functions are contemplated and can include by way of example but not limitation, gaming functions, academic functions, entertainment functions, multimedia functions, music functions, movie functions, an online store, an online application store, etc.

In some instances, a particular workspace (e.g., workspace 460) may be dedicated to a single application, service, or function. For example, indicator 426 can be associated with the ESPN application, which when selected causes the workspace 460 to be graphically presented in the environment 410. The workspace 460 can then include several indicators, each of which is selectable to access features and functionalities provided by the ESPN application (e.g., which may include latest scores in the NHL, NFL, NBA, latest trading news, playoff schedule, etc.). The indicators, when selected, can be used to access each individual service, which can be graphically presented in the user environment as a 2D interface or another 3D environment. Any number of workspaces can be presented in the user environment 410 with any number of them being shown in 3D (any number of layers of workspaces can be shown in the z-direction in the user environment 410) and with any number of them shown in 2D.

Figure 5:
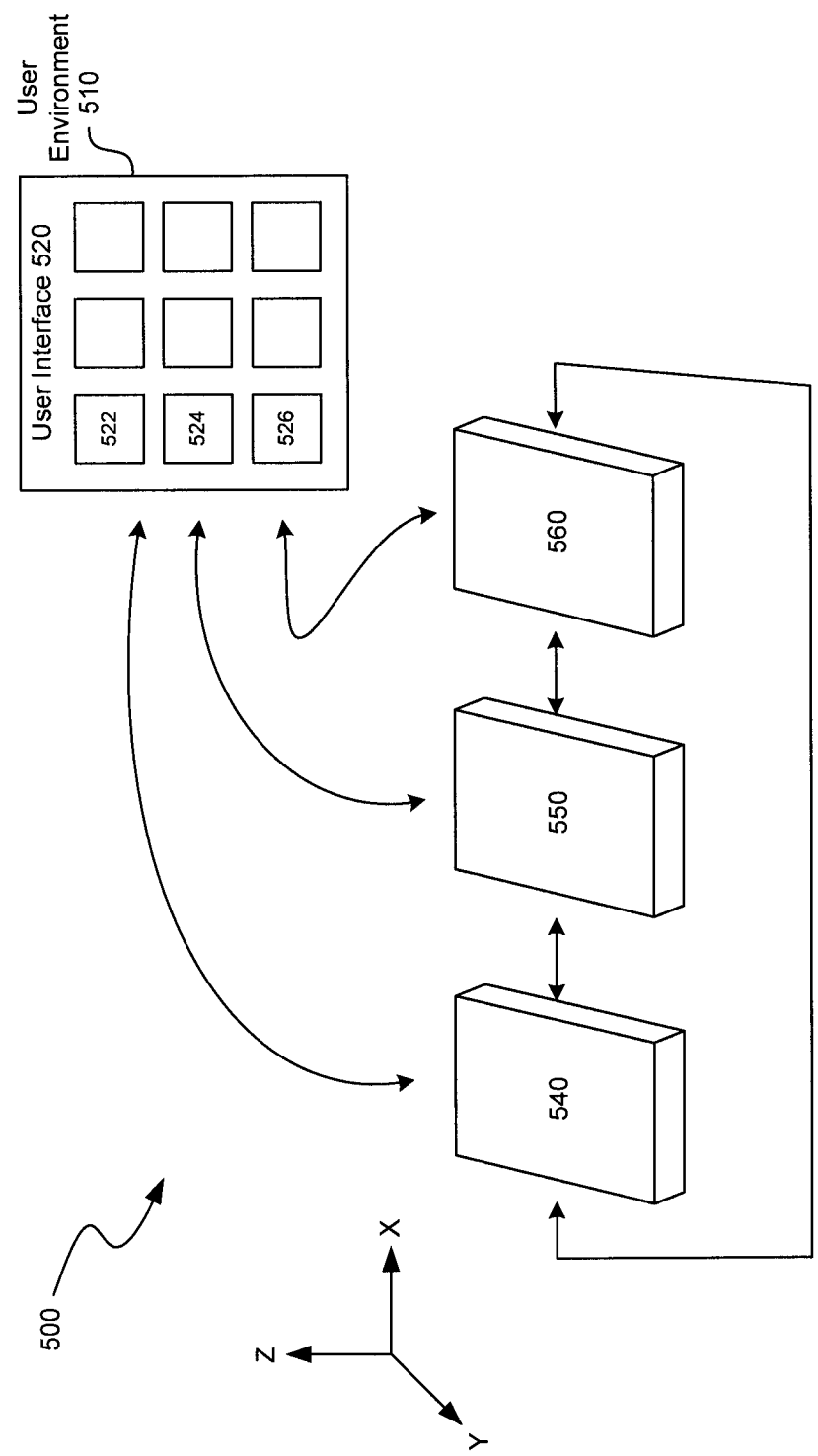
FIG. 5 depicts an example diagram showing navigation across workspaces.

Note that, as shown in the example of FIG. 5, individual workspaces 540, 550, and 560 can be accessed using their respective associated indicators 522, 524, and 526 from the common user interface 520 (which may be a home screen, desktop, or another screen). In addition, each workspace can be navigated between one another. For example, indicators in workspace 540 can be selected to access workspace 550 or 560, indicators in workspace 550 can be selected to access workspace 540 or 560, each of which, when graphically presented in the user environment 510, can be shown as having a third dimension relative to the planar interface defined by the x-y surface. Indicators in the respective workspaces can be selected to navigate to other workspaces without first returning to the user interface 520 or home screen, for example.

Figure 6:
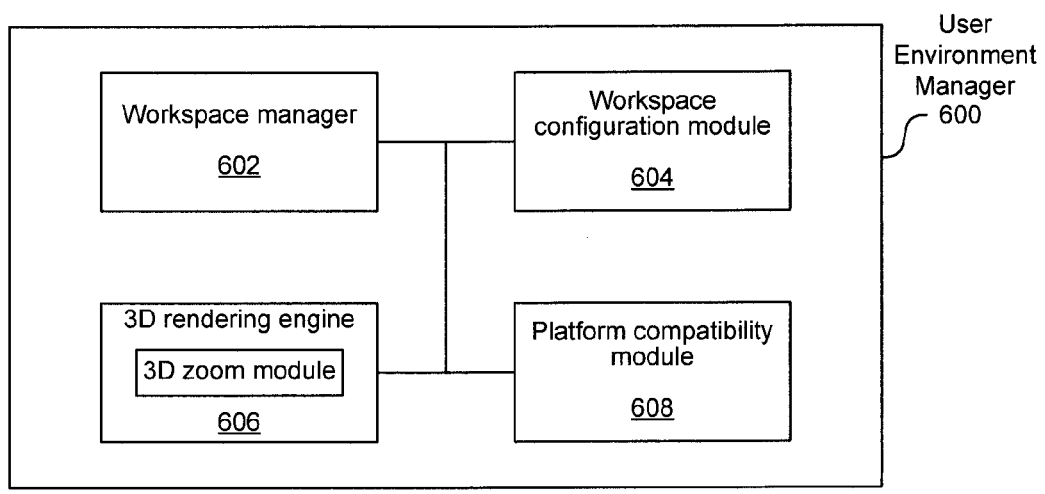
FIG. 6 depicts a block diagram illustrating example components of a user environment manager which provides the 3D mobile user interface with configurable workspace management capabilities.

FIG. 6 depicts a block diagram illustrating example components of a user environment (UE) manager 600 which provides the 3D user interface with configurable workspace management capabilities. The user environment (UE) manager 600 can include, for example, a workspace manager 602, workspace configuration module 604, 3D rendering engine 606, and/or a platform compatibility module 608. Additional or less components/modules/engines can be included in the UE manager 600.

As used in this paper, a "module," a "manager," a "handler," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used in this paper, a computer-readable medium or computer-readable storage medium is intended to include all mediums that are statutory (e.g., in the United States or under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, etc.), but may or may not be limited to hardware.

In general, each of the workspace manager 602, workspace configuration module 604, 3D rendering engine 606 and 3D zoom module, platform compatibility module 608, and any additional modules/engines includes any combination of software agents and/or hardware modules (e.g., including processors and/or memory units) able to perform the respective functions.

The workspace manager 602 can associate services and/or applications and/or features with a particular workspace. When a workspace 602 is defined for specific functions (e.g., personal, work, gaming, media, etc.), the manager 602 manages the association of the services/apps for the defined function of the workspace 602. In one embodiment, the manager 602 generates, identifies, aggregates, and/or depicts the indicators of the services/apps in the workspace 602. Such services/apps may be associated with a defined function.

One embodiment of the user environment (UE) manager 600 includes a workspace configuration module 604 which can manage, track, configure, re-configure, and re-set the workspace for a specific function (i.e., based on any of or a combination of, device state, user definition, user behavior, user state, service provider constraints, application settings, device location, etc.). The workspace configuration module 604 can modify (add, delete, reset) the apps/services accessible through the workspace by adding or removing or otherwise readjusting the indicators which can be accessible in the workspace.

The configuration module 604 can also determine the placement of indicators in respective workspaces according to any defined rules (e.g., frequency of access, type of application and/or type of service) and/or based on device default settings and/or user preferences. Configuration module 604 can also determine or configure the relative placement in 3D (depth or value in z-direction) of one workspace with another workspace, based on any defined rules and/or based on device default settings and/or user preferences. Workspaces can be turned on or off based on user settings. For example, if a user is on vacation, he/she may manually configure the user environment to turn "off" the professional workspace for a specific number of days, or for specific hours during the day.

The configuration module 604 can internally manage and track a set of rules (e.g., device, user, location, OS, and/or network provider based) that determines how the workspaces and the indicators are depicted/organized/placed relative to one another. For example, the configuration module 604 may automatically place the professional workspace on as the top layer during business hours and the personal workspace as the top layer during off hours and weekends.

Furthermore, based on location awareness, the configuration module 604 may predict that a user is more likely to access certain applications. For example, if the device is outside of its home location (e.g., if the user is traveling or driving), the configuration module 604 may place a mapping function, driving directions or other location search related apps in a top layer workspace for ease of access. The configuration module 604 can place, re-configure a related workspace (e.g., a "travel" workspace) according to real-time user activities. For example, the travel workspace may be moved to the top layer or shifted up in layers for ease of access if the user is determined to be traveling.

Similarly, if device location indicates that a user is physically at work, the configuration module 604 may place the user's personal workspace in a higher layer than the professional workspace for easier access.

The 3D rendering engine 606 can be utilized by the UE manager 600 in graphically presenting workspaces in a user environment as having a third dimension relative to a planar surface of the device (e.g., to an interface in the user environment). In one embodiment, workspaces are presented as having a third dimension via a zooming action, for example, by a 3D zoom module.

The platform compatibility module 608 can implement any of device manufacturer, network service provider, or device operating system specific features and ensure cross compatibility with the 3D user interface. For example, compatibility module 608 can integrate any indicators associated device features (e.g., settings, device configuration, screen settings, power settings, etc.) into a workspace for proper 3D rendering. Additionally, module 608 can ensure cross compatibility of 3D user interface features and/or workspace management configurability features with third-party applications.

The UE manager 600 represents any one or a portion of the functions described for the individual managers/engines. The UE manager 600 can include additional or less modules. More or less, functions can be included, in whole or in part, without deviating from the novel art of the disclosure.

Figure 7:
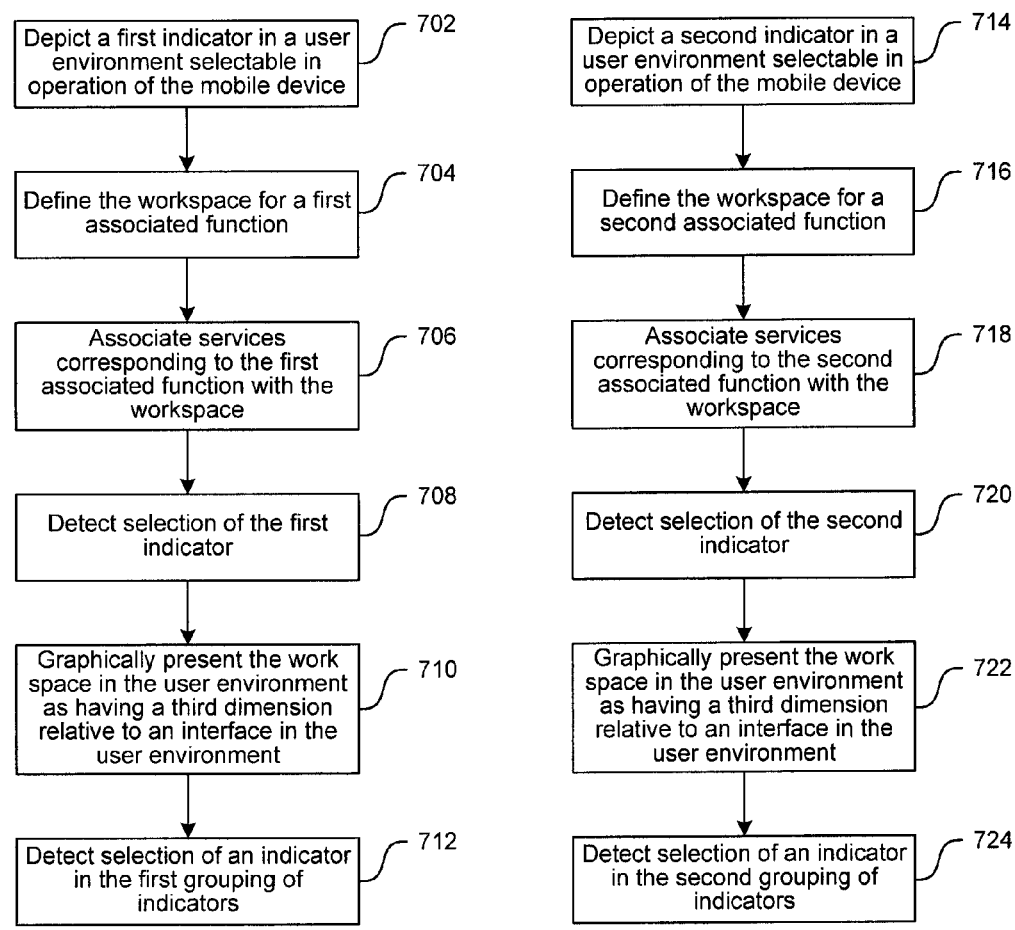
FIG. 7 depicts a flow chart illustrating example processes through which various workspaces with associated functions can be accessed in a user environment.

FIG. 7 depicts a flow chart illustrating example processes through which various workspaces with associated functions can be accessed in a user environment.

In process 702, a first indicator in a user environment selectable in operation of the mobile device is depicted. The first indicator is generally visually depicted (e.g., a button, icon, or tile) although the indicator may also be partially or wholly audible or otherwise perceivable by a user of the mobile device. The indicator may be depicted in a home screen in the user environment or another screen.

In process 704, the workspace is defined for a first associated function. The function can be defined according to a rule, platform defined, or based on a user's configuration. For example, the associated function can be a professional function, a personal function, or any other functions including but not limited to, entertaining, gaming, shopping, news, etc. In process 706, services corresponding to the first associated function are associated with the workspace.

In process 708, selection of the first indicator (associated with the defined workspace) is detected. The selection of the first indicator can be input by the user in any known or conventional manner, including touch screen (single touch, multi-touch), via keyboard, mouse, voice command, gesture sensing, motion detection, etc.

In process 710, the workspace in the user environment is presented as having a third dimension relative to an interface in the user environment. In one embodiment, the workspace is presented as having the third dimension (z-depth) via a zooming action in the user environment. Indicators or icons for services such as device features, applications, or mobile applications which can be accessed on the mobile device can be graphically associated with the workspace such that they become visible or otherwise perceivable by the user when the workspace is presented. In addition, the services corresponding to the first associated function is user-defined in part or in whole. In one embodiment, each of the indicators are also viewable in the third dimension (z-direction) in the workspace in the user environment.

In one embodiment, the workspace includes a first grouping of indicators, each of which is selectable to access a service corresponding to the first associated function. The grouping of indicators may be wholly or in part aggregated or selected by a user. The ordering and placement of the indicators in the workspace may also be partially or wholly configured by the user.

In process 712, selection of an indicator in the first grouping of indicators is detected. As a result, another interface or workspace can be depicted, which may also have the third dimension (z-depth) in the user environment. This other interface or workspace can include another grouping of indicators each of which is selectable to access a corresponding service in the services corresponding to the first associated function. Similarly, processes 714-724 depict the flow of rendering another workspace in 3D in the user environment.

Figure 8:
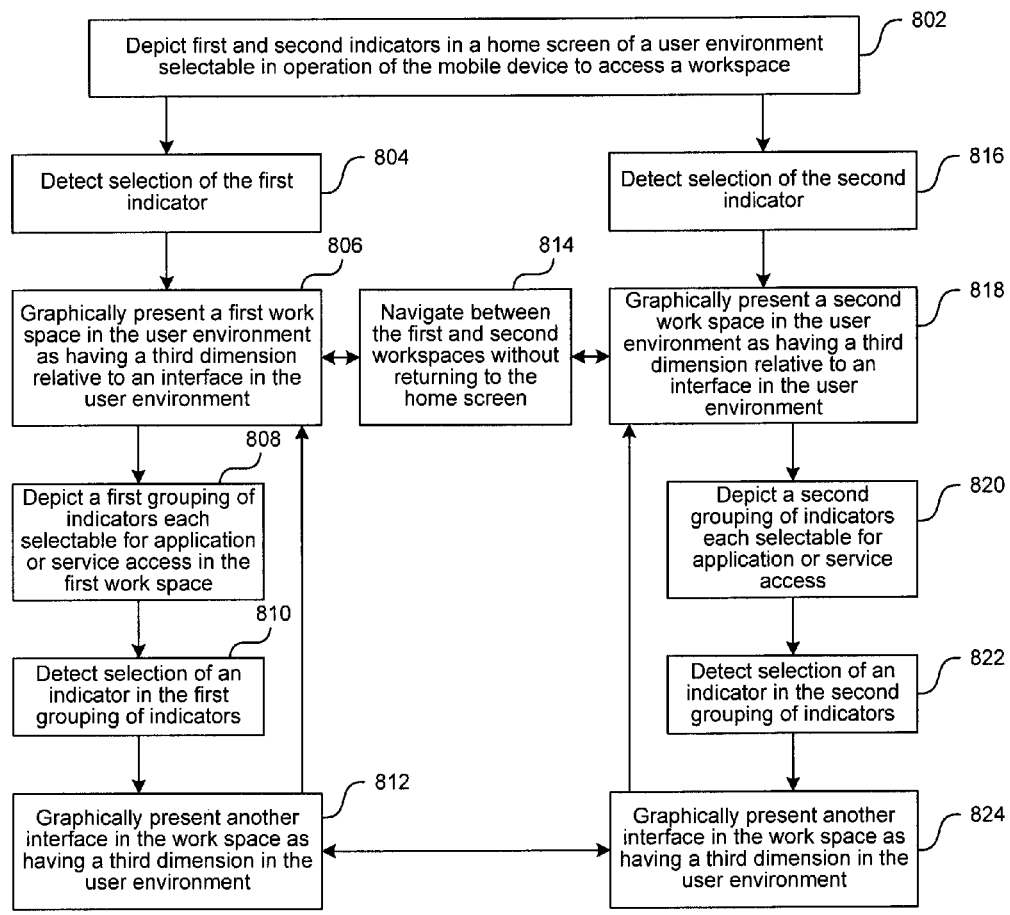
FIG. 8 depicts a flow chart illustrating an example process for navigating among workspaces shown in 3D without returning to the home screen.

FIG. 8 depicts a flow chart illustrating an example process for navigating among workspaces shown in 3D without returning to the home screen.

In process 802, first and second indicators are depicted in a home screen of a user environment selectable in operation of the mobile device to access a workspace.

In process 804, selection of the first indicator is detected. In process 806, a first workspace is graphically presented in the user environment as having a third dimension relative to an interface in the user environment. The first workspace can be minimized or shifted into the background when the user is not interacting with it.

In process 816, selection of the second indicator is detected and in process 818, a second workspace in the user environment as having a third dimension relative to an interface in the user environment. If the second workspace is still open, the user can navigate between the first and second workspaces without returning to the home screen (as shown diagrammatically in the example of FIG. 5). Alternatively, each workspace can include a return feature (e.g., accessible by a return indicator such as a button) allowing the user to return to the home screen to navigate between different workspaces. In one embodiment, the first and second workspaces are positioned in the user environment as having different depths, the ordering of which can be determined based on contextual data of the user or the mobile device.

While in the workspaces, the user can select the indicators to access additional interfaces or workspaces which have 3D relationships to one another, as illustrated in flows 810-812 and 822-824. The user can also navigate among subsequent workspaces with or without first returning to the first or initial screen.

Figure 9:
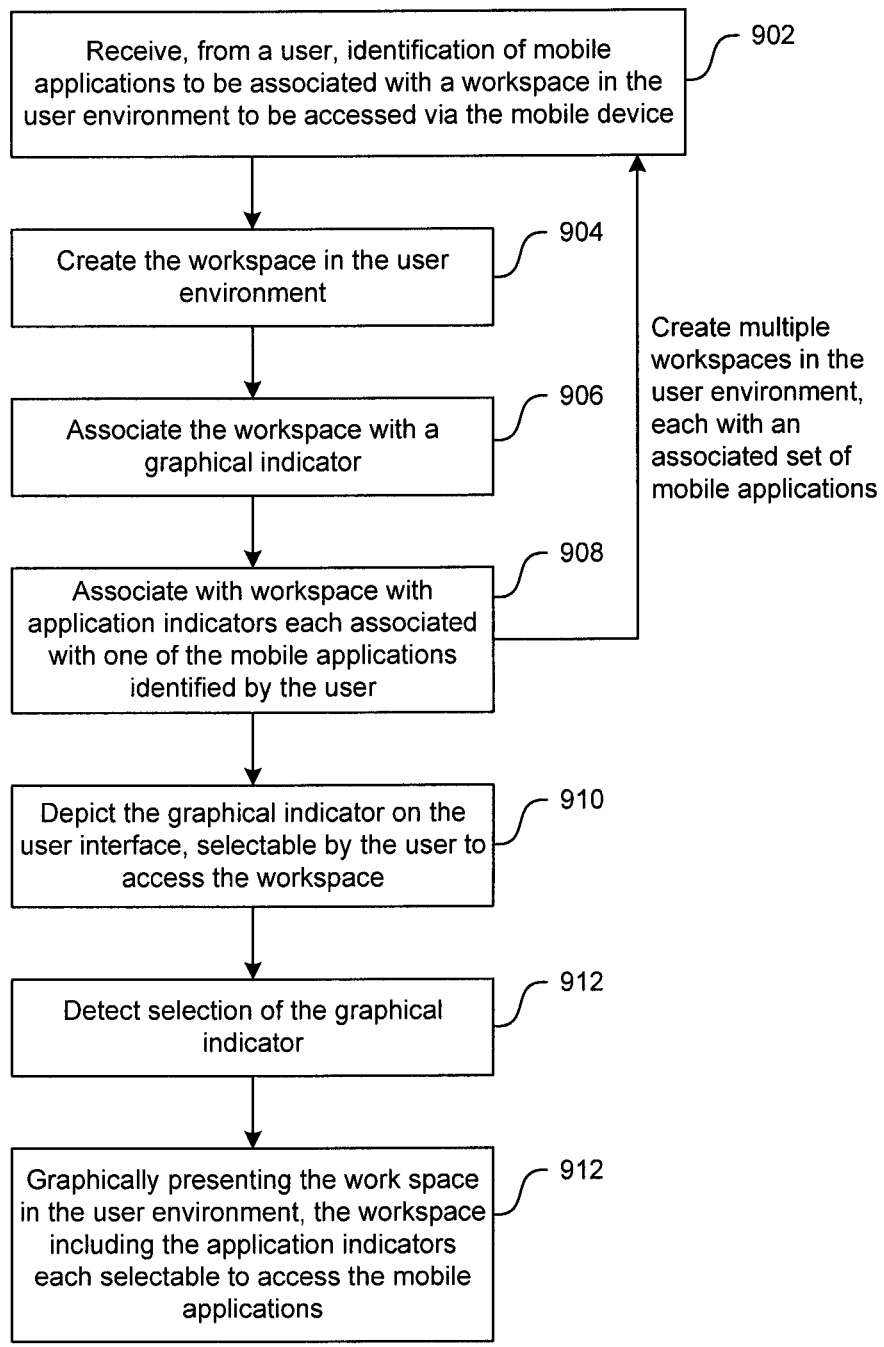
FIG. 9 depicts a flow chart illustrating example process for a user to configure a workspace for a selected function in a user environment.

FIG. 9 depicts a flow chart illustrating example process for a user to configure a workspace for a selected function in a user environment.

In process 902, identification of mobile applications to be associated with a workspace in the user environment to be accessed via the mobile device is received from a user.

In process 904, the workspace is created in the user environment. Note that the workspace can be associated with a specific user account and, in some instances, different workspaces having different application associations are created for different user accounts on the mobile device. In process 906, the workspace is associated with a graphical indicator.

In process 908, the workspace is associated with application indicators each associated with one of the mobile applications identified by the user. Multiple workspaces can be created and can operate in the user environment, each with an associated set of mobile applications, for example. The associated set of mobile applications selected by the user or set in default is based on a device or OS platform.

In process 910, the graphical indicator selectable by the user to access the workspace is depicted in the user interface. In process 912, selection of the graphical indicator is detected. In process 914, the workspace is graphically presented in the user environment. The workspace can include the application indicators each of which is selectable to access mobile applications.

Figure 10:
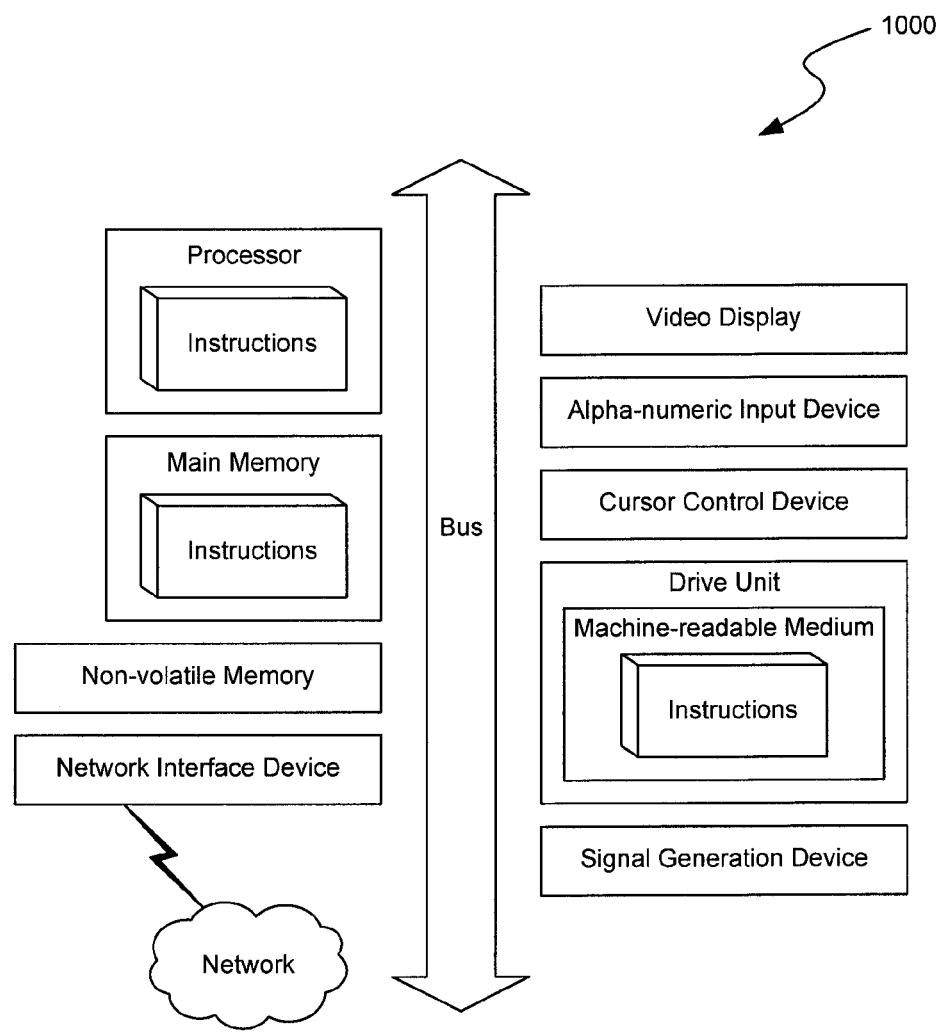
FIG. 10 shows a diagrammatic representation of a machine in the example form of a computer system within which a set of instructions, for causing the machine to perform any one or more of the methodologies discussed herein, may be executed.

FIG. 10 shows a diagrammatic representation of a machine in the example form of a computer system within which a set of instructions, causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. .sctn. 112, 6, other aspects may likewise be embodied as a means-plus-function claim, or in other forms, such as being embodied in a computer-readable medium. (Any claims intended to be treated under 35 U.S.C. .sctn. 112, 6 will begin with the words "means for.") Accordingly, the applicant reserves the right to add additional claims after filing the application to pursue such additional claim forms for other aspects of the disclosure.

What is claimed is:

1. A mobile terminal comprising:
a display unit configured to display a three-dimensional image comprising a first interface at a first depth selectable to access one or more of at least a plurality of objects, and a second interface at a second depth selectable to access one or more of at least a plurality of objects;

a memory unit configured to store property information for a plurality of applications, wherein each of the plurality of applications corresponds to one object of the plurality of objects of the first or second interface; and a controller configured to:
  detect a selection of the plurality of objects,
  execute the plurality of applications corresponding to the selected plurality of objects,
  generate priority information to determine priority levels for the executed plurality of applications based on the property information, and
  control the display unit to arrange a display of the executed plurality of applications on the three-dimensional image based on position information mapped to the generated priority information;
  wherein one of the first and second interfaces is partially shielded from view by the other according to the first depth and second depth; and
  wherein at least one of the first depth and the second depth is automatically changed based on a location of the mobile terminal.

2. The mobile terminal of claim 1, wherein a depth of each of the executed plurality of applications displayed on the three-dimensional image is set based on the generated priority information.

3. The mobile terminal of claim 1, wherein the priority information is based off of frequency of access, type of application, and type of service.

4. The mobile terminal of claim 1, wherein the display is further controlled according to defined rules based on user settings.

5. The mobile terminal of claim 1, wherein the controller is further configured to arrange the display in a three dimensional orientation.

6. The mobile terminal of claim 1, wherein the controller is further configured to arrange the plurality of applications based on real-time user activities.

7. A control method of a mobile terminal, the method comprising:
  displaying a three-dimensional image comprising a first interface at a first depth selectable to access one or more of at least a plurality of objects, and a second interface at a second depth selectable to access one or more of at least a plurality of objects;
  detecting a selection of the plurality of objects of the first or second interface;
  executing a plurality of applications that each correspond to one of the selected plurality of objects;
  generating priority information to determine priority levels of the executed plurality of applications based on property information; and
  arranging a display of the executed plurality of applications on the three-dimensional image based on position information mapped to the generated priority information;

wherein one of the first and second interfaces is partially shielded from view by the other according to the first depth and second depth; and wherein at least one of the first depth and the second depth is automatically changed based on a location of the mobile terminal.

8. The method of claim 7, further comprising:
setting a depth of each of the executed plurality of applications displayed on the three-dimensional image based on the generated priority information.

9. The method of claim 7, wherein the priority information is based off of frequency of access, type of application, and type of service.

10. The method of claim 7, wherein arranging further includes arranging the display according to defined rules based on user settings.

11. The method of claim 7, wherein arranging further includes arranging the display in a three dimensional orientation.

12. The method of claim 7, wherein arranging further includes arranging the plurality of applications based on real-time user activities.

13. A mobile terminal comprising:
  a display unit configured to display a three-dimensional image comprising a first interface at a first depth selectable to access one or more of at least a plurality of objects, and a second interface at a second depth selectable to access one or more of at least a plurality of objects; and
  a controller configured to:
    detect a selection of the plurality of objects of the first or second interface,
    execute a plurality of applications that each correspond to one of the selected plurality of objects, and
    control the display unit to arrange a display of the executed plurality of applications on the three-dimensional image based on position information mapped to a selection order;
    wherein one of the first and second interfaces is partially shielded from view by the other according to the first depth and second depth; and
    wherein at least one of the first depth and the second depth is automatically changed based on a location of the mobile terminal.

14. The mobile terminal of claim 13, wherein a depth of each of the executed plurality of applications displayed on the three-dimensional image is set based on the selection order.

15. The mobile terminal of claim 13, wherein the selection order includes priority information that is based off of frequency of access, type of application, and type of service.

16. The mobile terminal of claim 15, wherein the display is further controlled according to defined rules based on user settings.

17. The mobile terminal of claim 15, wherein the controller is further configured to arrange the display in a three dimensional orientation.

18. The mobile terminal of claim 15, wherein the controller is further configured to arrange the plurality of applications based on real-time user activities.

* * * * *